United States Patent
Iwamoto et al.

(10) Patent No.: US 6,906,694 B2
(45) Date of Patent: Jun. 14, 2005

(54) ELECTROMAGNETIC DIGITIZER AND DISTORTION-FREE LCD

(75) Inventors: Naohisa Iwamoto, Saitama (JP); Takashi Namura, Saitama (JP); Toshihide Chikami, Saitama (JP); Sadao Yamamoto, Saitama (JP)

(73) Assignee: Wacom Co., Ltd., Saitama (JP)

( * ) Notice: Subject to any disclaimer, the term of this patent is extended or adjusted under 35 U.S.C. 154(b) by 285 days.

(21) Appl. No.: 10/198,043

(22) Filed: Jul. 19, 2002

(65) Prior Publication Data

US 2003/0025677 A1 Feb. 6, 2003

Related U.S. Application Data

(60) Provisional application No. 60/307,178, filed on Jul. 24, 2001.

(51) Int. Cl.$^7$ .................................................. G09G 3/36
(52) U.S. Cl. ....................................................... 345/104
(58) Field of Search ............................... 345/87, 90–92, 345/96, 104, 173, 175, 178, 179; 178/18.01–18.07, 19.01–19.04; 349/141, 143

(56) References Cited

U.S. PATENT DOCUMENTS

| | | | | |
|---|---|---|---|---|
| 4,542,960 A | * | 9/1985 | Yang | 349/141 |
| 6,215,542 B1 | | 4/2001 | Lee et al. | 349/143 |
| 6,233,034 B1 | | 5/2001 | Lee et al. | 349/141 |
| 6,642,985 B2 | * | 11/2003 | Kim et al. | 349/141 |
| 6,646,707 B2 | * | 11/2003 | Noh et al. | 349/141 |
| 6,678,027 B2 | * | 1/2004 | Park et al. | 349/141 |

* cited by examiner

*Primary Examiner*—Vijay Shankar
(74) *Attorney, Agent, or Firm*—Liniak, Berenato & White, LLC

(57) ABSTRACT

An input/output device is disclosed that includes a digitizer with an LCD mounted thereon and a protective layer mounted directly on the LCD to minimize the parallax errors that have heretofore occurred when a protective layer was mounted in a spaced relation from an LCD. The LCD is a fringe field switching (FFS) LCD which does not distort when pressure is applied to its upper surface through the directly connected protective layer.

20 Claims, 4 Drawing Sheets

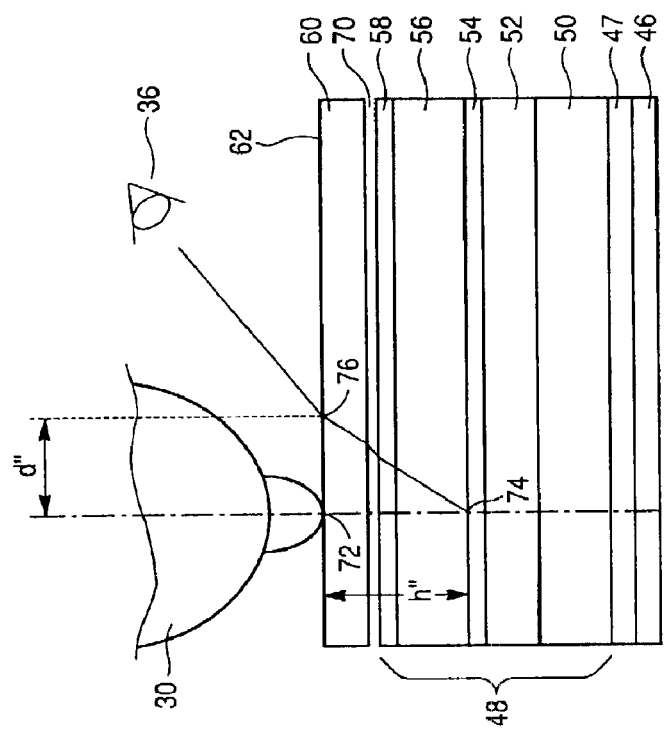
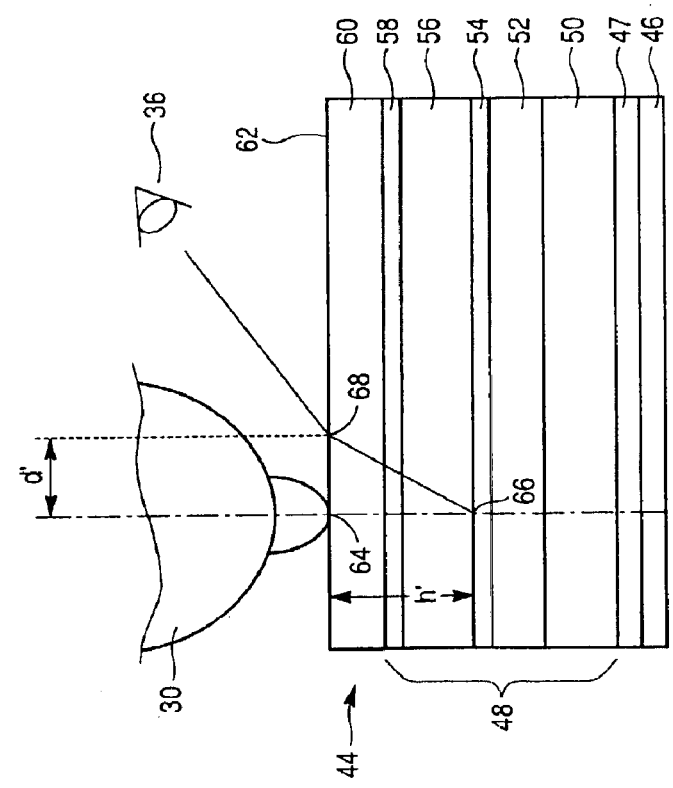

ELECTROMAGNETIC DIGITIZER AND DISTORTION-FREE LCD

CROSS-REFERENCE TO RELATED APPLICATIONS AND CLAIM TO PRIORITY

This is a non-provisional application of provisional application Ser. No. 60/307,178, filed Jul. 24, 2001 for the invention entitled Electromagnetic Digitizer and Distortion-Free LCD, the disclosure of which is incorporated herein by reference and priority of which is claimed.

FIELD OF THE INVENTION

The present invention is directed to an electronic input/output apparatus including a position-detecting device, such as a digitizer, and an LCD on which an image is produced when a stylus is moved over the LCD, and more specifically, to an input/output device having a digitizer and an LCD, which LCD produces an undistorted image even when pressure is applied thereto.

BACKGROUND OF THE INVENTION

A digitizer is an electronic input device comprising a surface and a plurality of sensors. When a stylus is moved over the digitizer surface, the position of the stylus point is detected by the sensors underlying the surface of the digitizer, and an image typically is produced on an output device, such as a computer monitor. (Alternately, the stylus may include a sensor for detecting emissions from the digitizer.) The sensors may be, for example, optical, electromagnetic or pressure sensitive. Such devices are often used in graphics tablets that can be placed near a computer monitor to allow a person to write or draw with a pen on the tablet, and have the drawn image appear on the computer screen.

One shortcoming of such systems is that the correlation between locations on the tablet writing surface and the image on the screen is difficult to determine. Thus, if a user wishes to add a line to a drawing on a screen, he may not know where to position the stylus on the digitizer. While such systems work well for rough sketching or for capturing a person's signature, for example, more detailed writings or drawings are difficult to produce without significant trial and error.

More recently, digitizers have been combined with liquid crystal displays ("LCD's") mounted over or under a digitizer, and aligned therewith so that a stylus creates an image on the LCD directly below where the stylus is placed. A protective layer of material is generally placed over the LCD to keep it from being damaged by the stylus. This gives the user the impression of writing directly on the LCD, and allows the user to remove the stylus from the device momentarily and know exactly where to re-place the stylus when he resumes work on a drawing. Such combined digitizers and LCD's are commonly seen in hand-held personal digital assistants (PDA's) and are also found in drawing tablets such as the Cintiq brand combined monitor and writing tablet available from Wacom Co., Ltd.

The image on the screen of a typical LCD becomes distorted when pressure is applied to the LCD—against the polarizer that forms the top layer of a typical LCD, for example. Therefore, when an LCD is used with a digitizer to make an electronic input/output device as described above, it is necessary to mount a protective layer of material above the top of the LCD. This layer is often formed from a non-rigid material that will be deflected a certain distance when pressure is applied by the stylus, such as during writing, drawing, etc. The distortion may be referred to as "puddling" due to its appearance. Therefore, it is necessary to space the protective layer from the LCD by a distance greater than this deflection distance to keep the protective layer from contacting the LCD when a stylus is used. However, it is important to minimize the gap between the polarizer and the protective layer for two reasons. First, the stylus must be relatively close to the digitizer to be detected, and, in many applications, the digitizer is already spaced from the stylus by the thickness of the LCD. Second, because the protective layer has a refractive index different from that of air, the air in the gap or space between the LCD surface and the digitizer top surface will create parallax errors when a user views the screen at an angle, as described in more detail below.

FIG. 1 is a representation of an image on a screen of a prior art LCD in an input/output device 8. FIG. 2 shows the screen input/output device 8 with a stylus pressing thereagainst. As can be appreciated from FIG. 2, the image on the screen is distorted significantly when pressure is applied, and has the puddling created by application of force to the polarizer material. FIG. 3 illustrates the protective layer of material over the LCD, so that a stylus presses against the protective layer rather than the LCD surface. The protective layer is formed of a material such as acrylic, that provides a good "feel" to a user writing with a stylus, that is, a material which resists the movement of the stylus point much like a sheet of paper resists the movement of a pen. The protective layer may be made of a rigid material, such as glass, that would have a very small deflection, but such material tends to scratch, is too fragile for general use, and does not provide a desirable "feel." Thus protective layers formed from preferred materials tend to flex when pressure is applied to them, and the gap between the protective layer and the LCD must be large enough so that the protective layer does not contact the LCD when a user writes on it. The protective plate and a gap between the plate and LCD increases the thickness of the input/output device, and also increases its manufacturing cost.

FIG. 3 also illustrates another problem caused by the gap between the LCD and the protective layer, namely the parallax error that occurs when using input/output devices with a protective layer spaced from an LCD by a gap. The display device comprises a digitizer 10, a backlight 11 mounted on the digitizer, and an LCD panel 12 mounted on the backlight. The LCD panel comprises a plurality of layers, namely, from bottom to top, a glass base 14, liquid crystal material 16, a color filter 18, a second glass base 20 and a polarizer 22. A protective panel 24 having a top surface 26 is mounted above LCD 14 and spaced therefrom by a gap 28. The distance between the top surface of the protective layer and the top of the color filter 18 where an image is created is denoted by the letter "h."

A stylus 30 is used to write on the input/output device. (The stylus 30 is preferably cordless and batteryless such as a stylus available from Wacom Co., Ltd., and disclosed in U.S. Pat. No. 4,848,553.) As will be appreciated from FIG. 3, when stylus 30 contacts top surface 28 at point 32, a spot is created at point 34 directly beneath point 32. A ray of light is schematically shown by line 40 between point 34 and the user. Due to the different indices of refraction of the glass in the LCD, the layer of protective material and the air in the gap and surrounding the unit, point 34 will appear to the user to be located at point 38 on the surface 28 of the protective layer at a distance d from point 32 rather than at point 32 under the tip of the stylus. This error becomes more pronounced at greater viewing angles, and decreases the accuracy with which a user can position the stylus.

It would therefore be desirable to provide an input/output device that minimizes parallax error by reducing the gap between the protective layer and the LCD without causing image distortion on the LCD when a stylus is used to write on the device.

SUMMARY OF THE INVENTION

These problems and others are addressed by the present invention which comprises an input/output device having an LCD that displays an image without appreciable distortion even when pressure is applied to the surface of the LCD. This allows a protective layer to be mounted directly on the LCD which in turn also minimizes parallax error. The preferred LCD is a fringe field switching ("FFS") LCD, and suitable FFS LCD's are available from Hyundai Electronics Industries Co., Ltd. and are described in U.S. Pat. No. 6,233,034 and U.S. Pat. No. 6,215,542, the disclosures of which are incorporated herein by reference. As discussed in the disclosures of those patents, FFS LCD's beneficially provide increased viewing angle and increased transmittance. Nothing in those references, however, suggests that an FFS LCD will produce an undistorted image when pressure is applied to its surface.

It is therefore a principal object of the present invention to provide an input/output device that displays an image with reduced parallax error.

It is another object of the present invention to provide an input/output device including a digitizer, an LCD and a writing surface directly supported by the LCD.

It is a further object of the present invention to provide an input/output device having an LCD that produces an image which does not distort when pressure is applied to the LCD.

It is still another object of the present invention to provide a method of forming an input/output device that produces an image that does not distort when pressure is applied to the LCD.

It is still a further object of the present invention to provide method of forming an input/output device that displays an image with reduced parallax error.

It is yet another object of the present invention to provide an input/output device that includes a fringe field switching LCD and a protective writing surface mounted over the LCD that engages the LCD when a user writes on the surface with a stylus.

In furtherance of these objects, a device is provided that includes an FFS LCD having a top panel forming a writing surface, a stylus and a position detector operably connected to the LCD for detecting a position of the stylus on the writing surface and creating an image on the LCD corresponding to the position.

Another aspect of the invention comprises a device that includes an FFS LCD and a flexible sheet of material having a bottom face and a top face comprising a writing surface mounted over the LCD and spaced therefrom by a first distance. The sheet of material has a deflection distance greater than the first distance. The device also includes a position detector operably connected to the LCD for detecting a position of a stylus on the writing surface and creating an image on the LCD corresponding to the position.

A method of manufacturing a device is also disclosed that includes the steps of providing an FFS LCD having a top surface, attaching a protective layer of material having a writing surface directly to the LCD top surface and operably connecting a position detector to the LCD for detecting a position of a stylus on the writing surface and creating an image on the LCD corresponding to the position.

Another aspect of the invention comprises an input/output device that includes a digitizer, an FFS LCD having a first side connected to the digitizer and a second side and a protective layer of material comprising a writing surface mounted directly to the LCD second side.

A further aspect of the invention comprises an input/output device that includes a digitizer and an FFS LCD mounted on the digitizer and having a top layer, wherein the top layer comprises a writing surface for a digitizer stylus.

A further aspect of the invention comprises an input/output device that includes an electromagnetic digitizer, an FFS LCD mounted on the digitizer, and a protective layer of material selected from the group consisting of acrylic and polycarbonate, forming a writing surface removably mounted over the LCD and spaced therefrom by a gap having a width. The protective layer is resiliently deflectable by a deflection distance greater than the width of the gap when pressure is applied to the protective layer.

An additional aspect of the invention comprises a method of manufacturing an input/output device comprising the steps of providing a digitizer, mounting an FFS LCD on the digitizer, attaching a protective layer of material directly to the LCD and connecting the digitizer to the LCD such that a stylus having a tip moving across the protective layer will be detected by the digitizer and such that an image will be formed on the LCD beneath the stylus tip.

BRIEF DESCRIPTION OF THE DRAWINGS

These and other objects and advantages of the invention will be better understood after a reading and understanding of the following detailed description of a preferred embodiment of the invention together with the following drawings.

FIG. 5 is a sectional view of the input/output device of FIG. 4 taken along line 5—5.

FIG. 6 is a sectional view of a second embodiment of an input/output device according to the present invention which includes a small gap between the writing surface and the LCD.

DETAILED DESCRIPTION OF THE INVENTION

Figure 1:
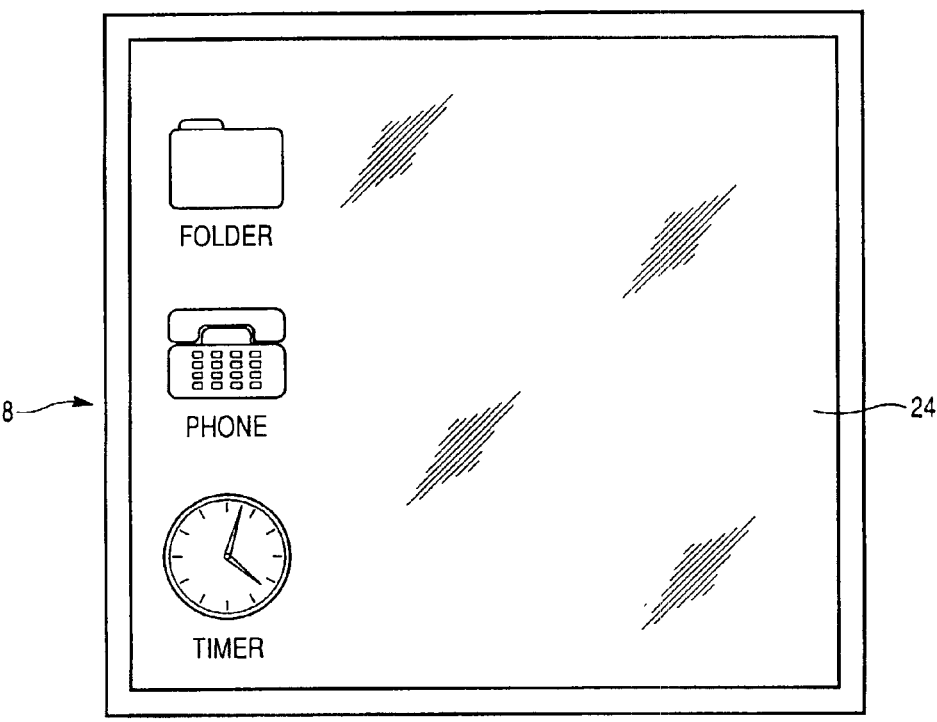
FIG. 1 is a plan view of a prior art input/output device incorporating a typical LCD.
Figure 2:
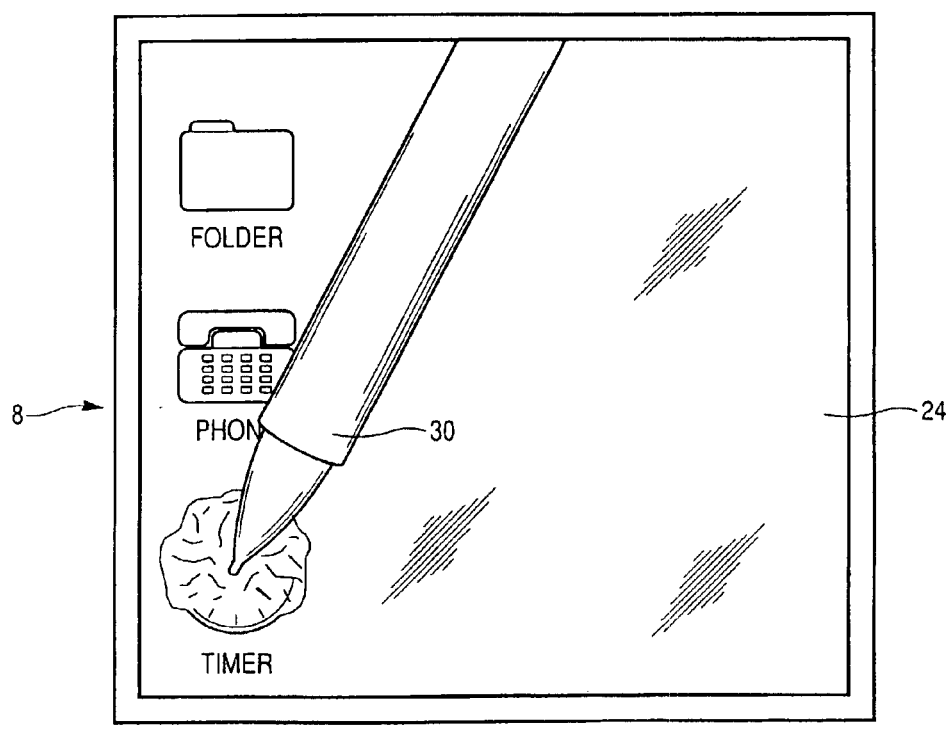
FIG. 2 is a plan view of the device of FIG. 1 showing how an image on the screen distorts when pressure is applied to the screen with a stylus.
Figure 4:
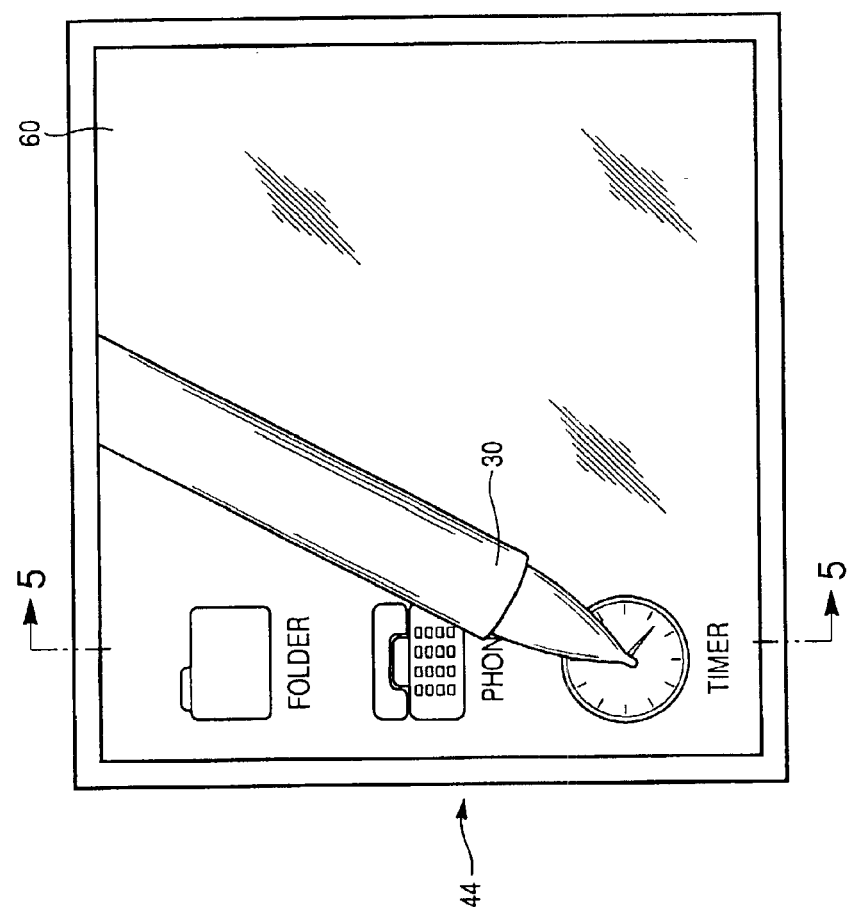
FIG. 4 is a plan view of the screen of an input/output device according to the present invention bearing an image that does not distort when pressure is applied to the screen with a stylus.
Figure 3:
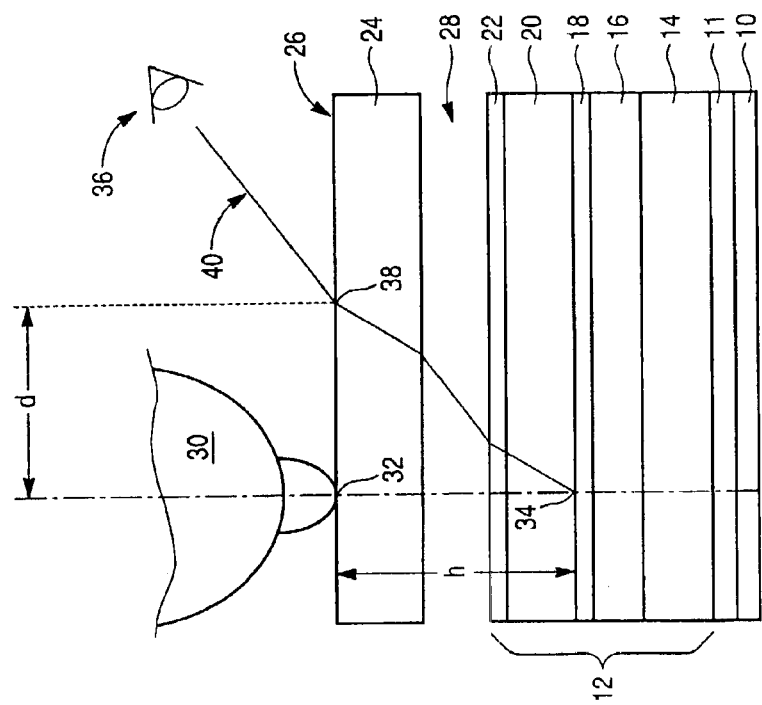
FIG. 3 is a side elevational view schematically showing the various layers of an input/output device according to the present invention.

Referring now to the drawings, wherein the showings are for the purpose of illustrating a preferred embodiment of the invention only, and not for the purpose of limiting same, FIGS. 4 and 5 show an input/output device 44 comprising a digitizer 46, a backlight panel 47, and an FFS LCD panel 48 that comprises a plurality of layers, namely, from bottom to top, a glass base 50, liquid crystal material 52, a color filter 54, a second glass base 56 and a polarizer 58. A protective panel 60 having a top surface 62 is mounted directly on polarizer 58 in face-to-face engagement therewith. Protective panel 60 is preferably made from acrylic or polycarbonate and protects the polarizer from being damaged by stylus 28.

The distance between the top surface of the protective layer and the color filter 54 where an image is created is denoted by h'. In this embodiment, there is no gap between the polarizer and the protective layer. When stylus 30 is pressed against the top surface 62 of protective panel 60 at a point 64, digitizer 46 detects the stylus and sends a signal to the LCD to cause the LCD to produce a dot at point 66 directly below point 64. Because there is no gap between the LCD and protective panel 60, only a small parallax error occurs, and to user 36, point 66 appears to be located at point 68 on top surface 62 of panel 60. Point 68 is spaced from the point 64 where the stylus touches the top surface by a distance d' that is less that distance d of the prior art input/output device. Mounting the protective layer directly on the LCD in thus manner thus not only reduces parallax error but results in a thinner input/output device.

A second embodiment of the invention is shown in FIG. 6 in which elements present in the first embodiment are identified with like reference numerals. The input/output device of this embodiment includes a digitizer 46, an FFS LCD panel 48 and a protective layer 60; however, the protective panel 60 is spaced from the polarizer 58 of the LCD by a small gap 70. The distance between the top surface of the protective layer and the color filter 54 where an image is created is denoted by h". When stylus 30 is pressed against the top surface 62 of protective panel 60, at a point 72, digitizer 46 detects the stylus and sends a signal to the LCD to cause the LCD to produce a dot at point 74 directly below point 72. Because there is only a small gap between the LCD and protective panel 60, only a small parallax error occurs, and to user 36, point 74 appears to be located at point 76 on top surface 62 of panel 60. Point 76 is spaced from the point 72 where the stylus touches the top surface by a distance d" that is less that distance d of the prior art input/output device and only slightly more than the distance d' of the first embodiment.

This mounting arrangement may allow the protective layer to be mounted to a housing surrounding the LCD or in a manner that allows the protective layer to be removed and replaced, or may be useful when manufacturing considerations make it undesirable to have the protective layer in direct contact with the LCD at all times. However, the gap 70 is smaller than the deflection distance of layer 60 and thus, layer 60 will flex and often come into contact with the LCD when a stylus is used to write on the input/output device. Mounting the protective layer in this closely spaced manner reduces the parallax error that occurs when the protective layer is spaced apart from the LCD by more than the deflection distance as was commonly done in the prior art, while the use of a FFS LCD substantially prevents image distortion on the LCD.

Figure 7:
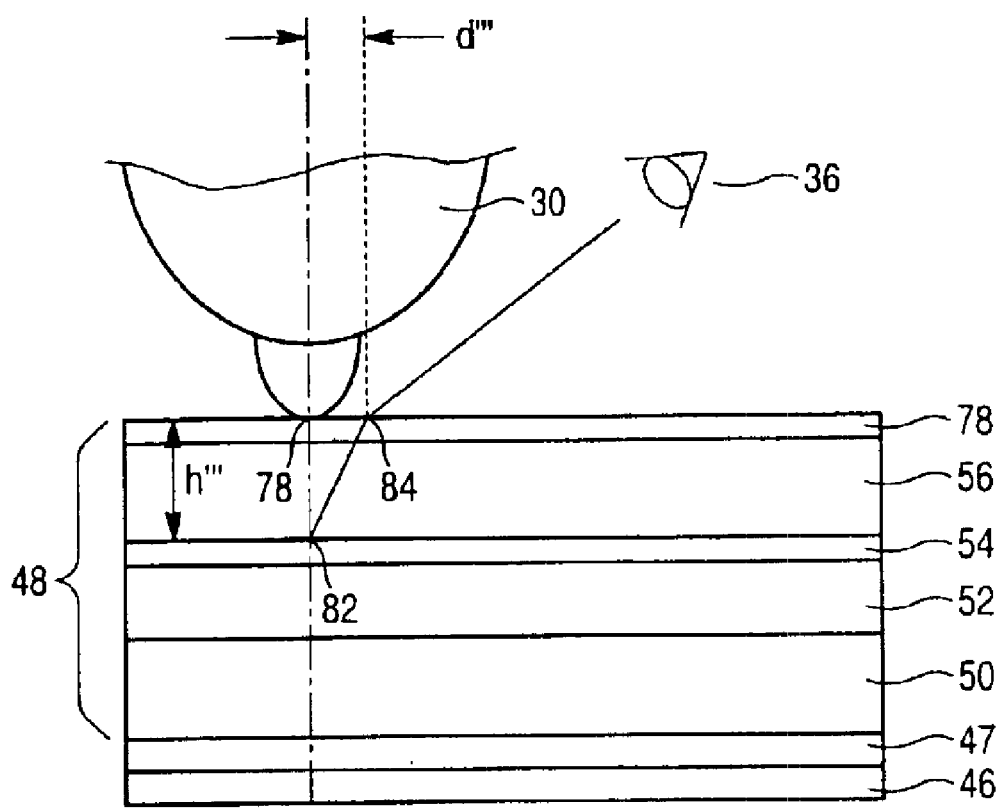
FIG. 7 is a sectional view of a third embodiment of an input/output device according to the present invention in which the polarizer of the LCD forms the writing surface of the input/output device.

A third embodiment of the invention is shown in FIG. 7 in which elements present in the first embodiment are identified with like reference numerals. The input/output of this embodiment is substantially similar to the input/output devices of the prior embodiments, but in this case a polarizer 78 is provided over the second glass base 56 that also serves as the writing surface for the input/output device. The distance between the top surface of the polarizer and the color filter 54 where an image is created is denoted by h'''. When stylus 30 is pressed against the top surface of polarizer 78 at a point 80, digitizer 46 detects the stylus and sends a signal to the LCD to cause the LCD to produce a dot at point 82 directly below point 80. This point appears to a user to be located at a point 84 on the top surface of the polarizer a distance d''' from point 80. Because LCD 48 is an FFS LCD, pressure can be applied directly to the polarizer without adversely affecting the LCD. The elimination of the protective layer further reduces the thickness of the input/output device.

The subject invention has been described in terms of several preferred embodiments. However, it should be understood that obvious modifications and additions to these embodiments will become apparent to those skilled in the art upon a reading of this specification. For example, while the subject invention has been described in terms of a digitizer mounted beneath an LCD, it would work equally well with a thin digitizer mounted over an LCD or with any other type of digitizer wherein an LCD is located beneath a writing surface or otherwise potentially subject to pressures when the digitizer is in use. It is intended that all such obvious modifications and additions be covered by this invention to the extend that they come within the scope of the several claims appended hereto.

We claim:

1. A device comprising:
   a fringe field switching LCD including a top layer and a bottom layer;
   a protective panel having a top face comprising a writing surface and a bottom face in contact with said to layer;
   a stylus; and
   a position detector operably connected to said LCD for detecting a position of said stylus on said writing surface and creating an image on said LCD at a location corresponding to said position.

2. The device of claim 1 wherein said position detector comprises a digitizer.

3. The device of claim 2 wherein said digitizer comprises an electromagnetic digitizer.

4. The device of claim 1 wherein said protective panel comprises a layer of acrylic.

5. The device of claim 1 wherein said protective panel comprises a layer of polycarbonate.

6. The device of claim 1 wherein said ton layer is a polarizer.

7. A device comprising:
   a fringe field switching LCD having a top surface;
   a flexible sheet of material having top face comprising a writing surface and a bottom face mounted over said ton surface of the LCD and spaced therefrom by a first distance, said sheet of material having a deflection distance greater than said first distance so that the bottom face is deflectably contactable with the top surface; and
   a position detector operably connected to said LCD for detecting a position of a stylus on said writing surface and creating an image on said LCD at a location corresponding to said position.

8. A method of manufacturing a device comprising the steps of:
   providing a fringe field switching LCD having a top surface;
   attaching a protective layer of material having a top face comprising a writing surface and bottom face directly to said LCD top surface so that the bottom face is in contact with the toy surface;

operably connecting a position detector to said LCD for detecting a position of a stylus on said writing surface and creating an image on said LCD corresponding to said position.

9. An input/output device comprising:

a digitizer;

a fringe field switching LCD having a first side connected to said digitizer and a second side; and a protective layer of material having a top face comprising a writing surface and a bottom face in face-to-face engagement with said LCD second side.

10. The input output device of claim 9 wherein said protective layer comprises a layer of acrylic.

11. The input output device of claim 9 wherein said protective layer comprises a layer of polycarbonate.

12. The input/output device of claim 9 wherein said LCD second side comprises a polarizer.

13. The input/output device of claim 9 wherein said digitizer comprises an electromagnetic digitizer.

14. The input/output device of claim 9 wherein said protective layer is removably attached to said LCD second side.

15. An input/output device comprising:

a digitizer having a toy surface; and a fringe field switching LCD having a bottom layer in contact with said top surface and having a top layer, wherein said top layer comprises a writing surface for a digitizer stylus.

16. The input/output device of claim 15 wherein said LCD includes a polarization filter and wherein said top layer comprises said polarization filter.

17. The input/output device of claim 15 wherein said digitizer comprises an electromagnetic digitizer.

18. An input/output device comprising:

an electromagnetic digitizer having a top surface;

a fringe field switching LCD mounted on said digitizer; and a protective layer of material removably mounted over said LCD, said protective layer selected from the group consisting of acrylic and polycarbonate, and said protective layer having a top face forming a writing surface and a bottom face spaced from said LCD by a gap having a width;

wherein said protective layer is resiliently deflectable by a deflection distance greater than the width of said gap when pressure is applied to said protective layer so that said bottom face is deflectably contactable with said LCD.

19. A method of manufacturing an input/output device comprising the steps of:

providing a digitizer;

mounting a fringe field switching LCD on said digitizer, the LCD having a top surface;

attaching a protective layer of material directly to the top surface of said LCD;

connecting said digitizer to said LCD such that a stylus having a tip moving across said protective layer will be detected by said digitizer and such that an image will be formed on said LCD beneath said stylus tip.

20. The input/output device of claim 19 wherein the step of providing a digitizer comprises the step of providing an electromagnetic digitizer.

* * * * *